March 1, 1966

KAZUO HAYASHI 3,237,902

DENTAL TRAY SUPPORTING MECHANISM

Filed June 1, 1964

INVENTOR
KAZUO HAYASHI

BY Reynolds & Christensen

Attorneys

March 1, 1966  KAZUO HAYASHI  3,237,902
DENTAL TRAY SUPPORTING MECHANISM
Filed June 1, 1964  4 Sheets-Sheet 4

INVENTOR
KAZUO HAYASHI
BY Reynolds & Christensen
Attorneys

United States Patent Office 3,237,902
Patented Mar. 1, 1966

3,237,902
DENTAL TRAY SUPPORTING MECHANISM
Kazuo Hayashi, Kyoto, Japan, assignor to Kabushiki Kaisha Morita Seisakusho, Kyoto, Japan, a corporation of Japan
Filed June 1, 1964, Ser. No. 371,258
Claims priority, application Japan, June 3, 1963, 38/29,114
5 Claims. (Cl. 248—281)

This invention relates to dental apparatus and more particularly to a supporting mechanism for a dental tray upon which various dental instuments are placed for use in dental work.

To support such a dental tray, it is known to use a mechanism comprising a parallel linkage movable or inclinable to different positions. Such a prior art mechanism is generally so arranged that so long as a predetermined amount of weight is imposed on the tray, the linkage is balanced and held stable in whatever inclined position it may be. However, the number of dental instruments to be employed in dental work and, consequently, to be placed on the tray varies with the type of treatment to be practised, and during the treatment, when the dentist has taken up any one of the instruments from the tray, the weight acting on the linkage changes. It will not suffice, therefore, to arrange merely so that the linkage supporting the tray is always balanced regardless of its inclination so long as a predetermined number of instruments are placed on the tray. As mentioned above, as the number of instruments placed on the tray varies during dental work, the weight acting on it varies, causing the tray supporting linkage to become unbalanced in a certain inclined position it happens to take.

The primary object of this invention is, therefore, to provide a dental tray supporting mechanism which can be conveniently moved or inclined to any desired position.

Another object of the invention is to provide a dental tray supporting mechanism which can be conveniently moved or inclined to any desired position.

Another object of the invention is to provide a dental tray supporting mechanism which can be held stable in any desired position regardless of its inclination and even when the number of instruments on the tray and, consequently, the weight acting on it varies during dental work.

Another object of the invention is to provide a tray supporting mechanism in which the tray supporting various dental instruments can be easily moved into different positions, relative to the mouth of the patient, most convenient for the dentist to take up any one of the instruments on the tray during treatment.

Other objects, features and advantages of the invention will be apparent from the following detailed description of preferred embodiments thereof with reference to the accompanying drawings wherein.

Figure 1:
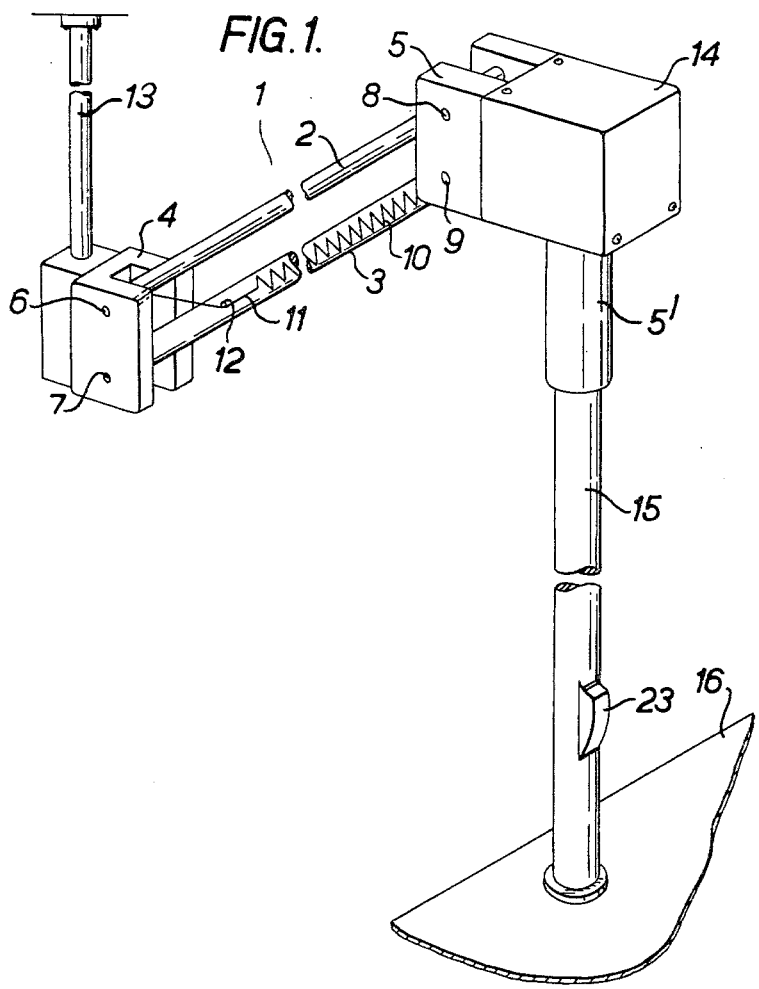
FIG. 1 is a fragmentary perspective view of one embodiment of the invention.

Now referring in detail to the drawings, the supporting mechanism of the invention comprises a linkage, generally designated 1, comprising a pair of parallel arms or links 2, 3 and a pair of brackets 4, 5. The opposite ends of the links 2 and 3 are connected to the brackets 4 and 5 by pivot pins 6, 7 and 8, 9, respectively, so that the four lines connecting the pins 6, 7, 8 and 9 form a parallelogram. The two links are inclinable or rotatable in a constant parallel relationship with each other about their respective pivot pins 6, 7, so that the bracket 5 supported by the other ends of the two links can be raised or lowered relative to the floor. A spring 10 is provided on the linkage for balancing it. The strength and the mounting position of the spring may be such that when the bracket 5 supports a weight, the spring can balance it, regardless of the inclination of the links. In the embodiment as shown in FIGS. 1 and 2, the spring 10 has its one end fixed to a suitable point of the link 3 and the other end connected to one end of a cable or wire 11 which passes over a pin 12 fixed to the link 3 and is connected at the other end to the link 2.

The bracket 4 is mounted on a pole 13 for horizontal rotation about the axis thereof. The pole 13 may conveniently hang from the ceiling of a clinic as shown in FIG. 1, or stand upright from the floor as will be explained in connection with another embodiment. The bracket 4 also be mounted on the wall of the clinic through such suitable means as enables the bracket 4 to turn horizontally so that the linkage 1 can swing also horizontally. The other bracket 5 has a chamber 14' defined by a cover 14, and also has a downwardly projecting portion 5', from which hangs a tubular support 15 having at its lower end a tray 16 on which various dental instruments are to be placed. Inside the tubular support 15, there are provided a pair of links or rods 17, 18 extending axially thereof and in alignment with each other. The lower link 17 is fixed at its lower end and has its upper end connected to the lower end of the other axially movable link 18 through another pair of relatively short connecting links 19, 20. The link 18 pierces through a tubular guide 21 and is guided thereby in its axial movement.

Figure 2:
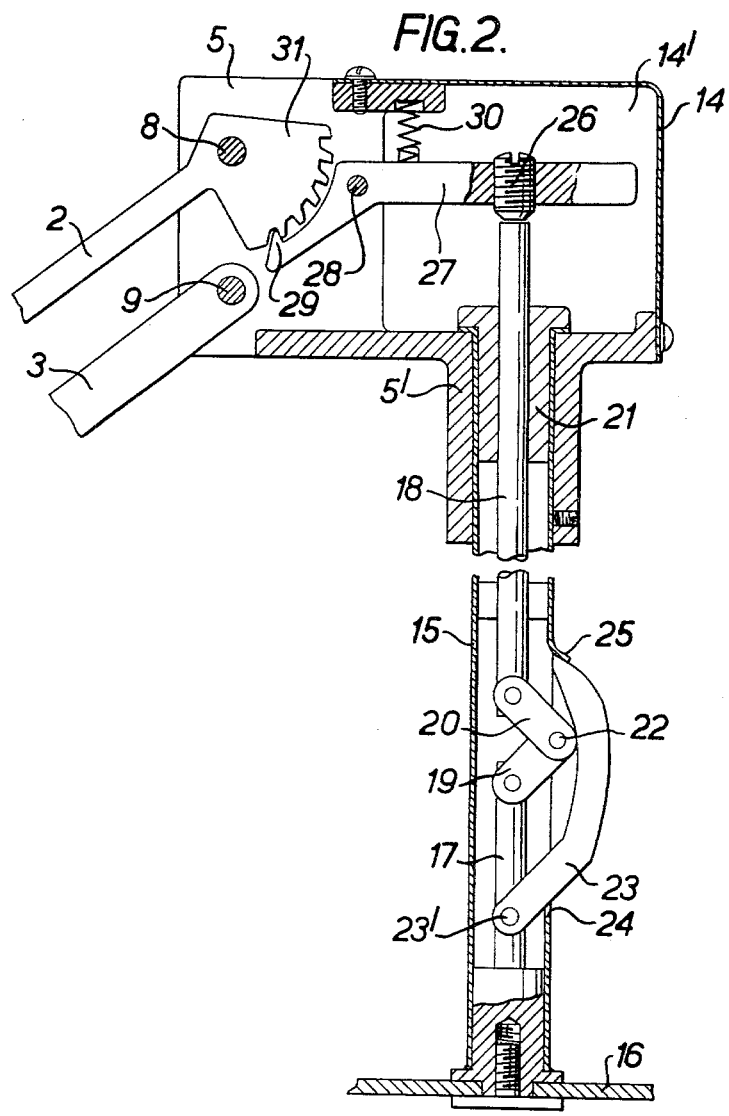
FIG. 2 is an enlarged elevational view in vertical section of FIG. 1, illustrating the principal portion of the interior mechanism.

In normal inoperative position, the two connecting links 19, 20 are bent sidewise at their connecting pin 22, as shown in FIG. 2, and the bent joint of the two links bears against the inner side of a curved lever 23 so that the outer side of the lever 23 projects outside through an opening 24 formed in the lateral wall of the tubular support 15 so as to form a push-button. The lever 23 is pivoted at one end by a pin 23' to the fixed link 17 and engages at the other free end with the upper edge 25 of the opening 24 to be prevented from falling off therefrom.

The upper link 18 extends upwardly into the chamber 14', within which its upper end bears against the lower end of an adjusting screw 26 mounted on one arm of a lever 27. The lever 27 is pivoted on the bracket 5 at 28 and provided at the end of the other arm with a pawl 29. The lever 27 is urged by a spring 30 so that its pawl 29 selectively engages with the teeth of a sector 31 formed on the end of the link 2.

Suppose that the linkage 1 is so arranged that when the total weight of the bracket 5, cover 14, support 15, tray 16 and the associated link elements acts on the linkage 1, it is balanced, although, in accordance with the invention, there needs be no such strict balance therebetween.

When different dental instruments are placed on the tray 16, the weight acting on it increases, which would cause parallel links 2, 3 of the linkage 1 to rotate clockwise in the figures about the pivot pins 6, 7, respectively, so that the bracket 5 and, consequently, the tray 16 would be lowered. However, engagement of the pawl 29 with one of the sector teeth prevents the pivotal movement of the links 2, 3. In other words, so long as the pawl 29 is in engagement with any one of the teeth of the sector 31, the angle between the link 2 or 3 and the line connecting the pivot pins 6 and 7 is kept constant, and neither the link 2 nor 3 is rotated by any additional force applied to the bracket 5, so that the linkage 1 is held stable in the position it takes then.

When it is desired to move the tray 16 into a different height or position, it is necessary to disengage the pawl 29 from the tooth it is then in engagement with so as to free the link 2. As will be easily seen, this can be effected by pressing the push-button, that is, the outer side of the lever 23. When pushed in, the lever 23 moves about its pivot pin 23' counterclockwise so that its inner side pushes the bent joint of the connecting links 19, 20 in such a direction as to straighten them up. This causes the link 18 to move axially upwardly in the tubular support 15 to rotate the lever 27 counterclockwise about its pivot pin 28 against the force of the spring 30 enough for the pawl 29 to disengage from the tooth of the sector 31 it has been in engagement with. While the pawl is out of engagement with the sector teeth, the links 2, 3 can be freely inclined and, consequently, the tray 16 can be freely moved into different positions by pulling the support 15 downwardly or raising it. When the press on the push-button is relieved, the link 18 gravitates and the spring 30 rotates the lever 27 clockwise to bring the pawl 29 into engagement with one of the sector teeth to prevent further movement of the linkage, and in this manner the tray can be held stable in that desired position it takes then.

If the teeth of the sector 31 are so shaped, as in the ratchet wheel, that the pawl 29 prevents only clockwise rotation of the sector 31 and not counterclockwise movement thereof, it is not necessary to push the push-button in order to raise the tray. That is, with the teeth on the sector 31 having a first surface substantially on a radius of the sector and a second surface disposed at an acute angle thereto, and with the pawl 29 having a latching surface which is substantially on a radius of the sector and positioned for engagement with the first surface on the teeth, a unidirectional latch is provided. In such case the non-radial or second surface of the teeth will act to cam the pawl away from the sector when sufficient counterclockwise force is applied to the sector 31 by elevation of the tray.

So long as the pawl 29 is in engagement with any one of the teeth of the sector 31, the tray is held stable there. Then, the balancing spring 10 would seem unnecessary. However, if there is no such balancing spring, when the pawl is released, the tray with its supporting mechanism would abruptly fall down and the operator would have to support the whole weight with his hand in bringing the tray into a desired position. To avoid such an inconvenience, the spring is very advantageously provided.

As previously mentioned, the bracket 4 is mounted on the pole 13, or otherwise mounted, for rotation about its axis. This arrangement enables horizontal swinging of the links 2, 3 and, consequently, horizontal displacement of the tray 16 independently of, or simultaneously with, its above-metioned vertical displacement.

Figure 3:
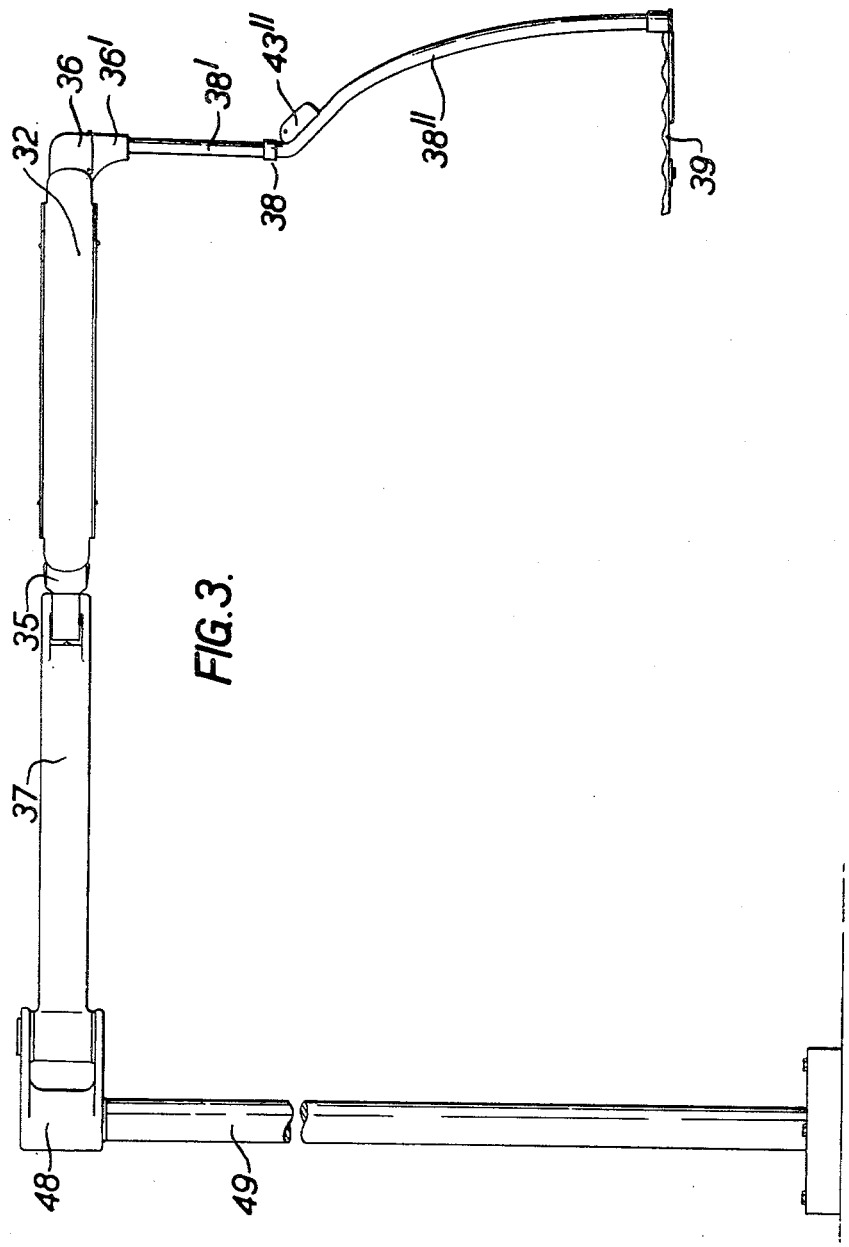
FIG. 3 is an elevational view of another embodiment of the invention.
Figure 4:
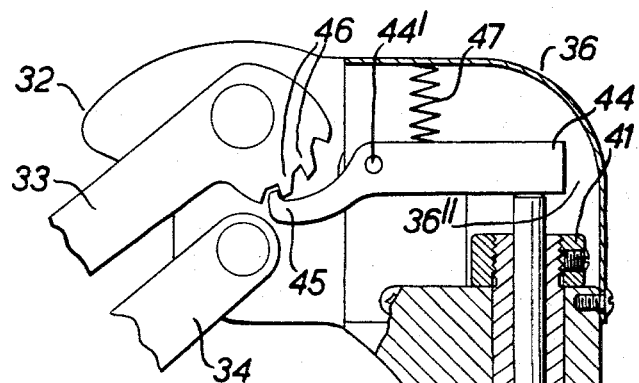
FIG. 4 is an enlarged elevational view in vertical section of a portion of FIG. 3.
Figure 5:
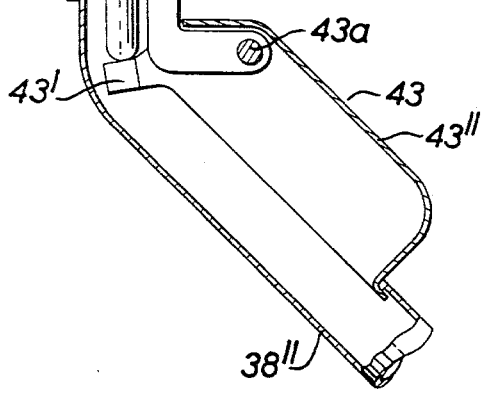
FIG. 5 is an enlarged elevational view in vertical section of another portion of FIG. 3.

FIGS. 3, 4 and 5 show another embodiment of the invention, wherein there is provided a linkage generally designated 32 and comprising a pair of parallel links 33, 34 and a pair of brackets 35, 36 to which the opposite ends of the links are pivotally connected. In this embodiment, the bracket 35 is connected to the outer end of a supporting arm 37 so that the links carried by the bracket 35 are horizontally swingable relative to the arm 37. The arm 37 is in turn connected at its other end to a bracket 48 so that it also is horizontally swingable. The bracket 48 is supported at the top of a pole 49 of suitable height standing upright on the floor. This bracket may also be supported at the lower end of a pole hanging from the ceiling, or it may be mounted directly on a wall of the clinic.

From the other bracket 36 hangs a tubular support 38 consisting of a straight upper portion 38' and a curved lower portion 38" supporting a tray 39 at its lowest end. The tubular support is rotatable about its own axis, but not slidable axially, relative to the bracket 36. To enable this, the upper end portion of the straight portion 38' of the tubular support 38 is pierced through a bore 40 formed in the downwardly projecting portion 36' of the bracket 36, with a shoulder 38'd formed on the upper straight portion 38' bearing against a corresponding shoulder 40a formed in the bore 40, and then terminates in a nut 41 screwed thereto. It will be easily seen that the nut 41 and the shoulder 38'a prevent any axial sliding movement of the support 38 relative to the bracket 36 but permits its free rotation about its own axis.

Inside the straight upper portion 38' of the support 38 there is provided an axially movable operating rod 42, the lower end of which is supported on one arm 43' of a lever 43 provided on the upper end of the curved lower portion 38" of the support 38. The other arm 43" of the lever 43 is formed into a push-button appearing outside. The upper end of the operating rod 42 extends into a chamber 36" formed in the bracket 36 and supports one arm of a lever 44 pivoted on the bracket by a pin 44'. The other arm of the lever 44 has its outer end formed into a pawl 45 selectively engageable with teeth 46 formed on the end of the link 33. The lever 44 is urged by a spring 47 so as to turn clockwise in the figure about the pin 44'.

When the push-button 43" is pressed, the lever 43 is turned clockwise about its pivot pin 43a so that the arm 43' raises the rod 42, which in turn moves the lever 44 counterclockwise against the spring 47 so as to disengage the pawl 45 from the tooth it is then in engagement with. Under the condition, the linkage 32 is free and ready for the tray 39 to be raised or lowered into desired position. When the operator relieves the push on the push-button 43", the rod 42 gravitates to turn the push-button to its original position on one hand and, on the other, to enable the spring 47 to turn the lever 44 clockwise for its pawl 45 to come into engagement with one of the teeth 46, whereby the tray is held stable there. As mentioned in connection with the previous embodiment, if the teeth 46 are of such shape as in a ratchet wheel, it is not necessary to push the push-button 43" to raise the tray.

With the arrangement that the tray supporting tubular member is rotatable about its own axis and that the tubular member has is lower portion curved, after the tray has been brought near the mouth of the patient by operating the mechanism, the tubular member may be rotated about its own axis to turn the tray to face the mouth of the patient, and with the tray thus set at the position nearest to the mouth of the patient, the curvature of the lower portion of the tubular member leaves a space between the member and the face of the patient great enough for the dentist to bring his head therebetween for convenient and effective performance of the dental treatment.

In accordance with the invention, the tray supporting mechanism hangs from the wall or ceiling of a clinic, or stands relatively far away from the dental chair the patient is seated in, so that there is nothing around the chair to obstruct free performance of the dentist.

It should be recognized that the embodiments disclosed herein are merely illustrative and changes and modifications will be made without departing from the true scope of the invention as claimed in the appended claims.

What I claim is:

1. A dental tray supporting mechanism comprising: a linkage comprising a pair of parallel links and a balancing spring; tray supporting means associated with said links and extending downwardly from one end thereof for supporting a tray at a level lower than and substantially remote from said one end of said parallel links; and means for releasably engaging said tray supporting means with at least one of said parallel links to selectively prevent relative movement therebetween and including a control member positioned intermediate said one end of said links and the lower end of said tray supporting means.

2. A dental tray supporting mechanism comprising: a linkage comprising a pair of parallel links with one of said links having a plurality of teeth formed thereon, a pair of brackets to which the opposite ends of said links are pivotally connected so that lines connecting the pivots form a parallelogram, a balancing spring having one end connected to one of the links and the other end to the other link; a supporting member on which one of said brackets is mounted for horizontal rotation about its own axis; a tubular supporting member hanging from said other bracket; a tray supported at the lower end of said tubular supporting member; engaging means associated with said linkage and provided in said tubular tray supporting member and said other bracket for releasably engaging with at least one of said parallel links to prevent movement of said linkage with respect to said tubular supporting member, said engaging means comprising a linkage and a lever operated by the linkage with said lever having a pawl adapted to releasably and selectively engage with any one of said plurality of teeth to lock movement of said first-named linkage, whereby said tray is held stable in the desired position; and means for operating said engaging means.

3. A dental tray supporting mechanism of claim 2, wherein said last-named linkage comprises a fixed link and an axially movable link arranged in axial alignment and connected by a pair of connecting links which are bent sidewise at their joint, said axially movable link having its free end operatively contacting said lever; and said last-named operating means comprises a lever having a portion operatively contacting the bent joint of said connecting links, said last-named lever being so arranged that when operated, it moves said connecting links to cause said axially movable link to turn said first-named lever so that its pawl disengages from one of said teeth on said one of the parallel links, whereby said first-named linkage is released.

4. A dental tray supporting mechanism comprising: a linkage comprising a pair of parallel links, a pair of brackets to which the opposite ends of said links are pivotally connected so that lines connecting the pivots form a parallelogram, a balancing spring having one end connected to one of the links and the other end to the other link; a supporting member on which one of said brackets is mounted for horizontal rotation about its own axis; a tubular supporting member hanging from said other bracket and rotatable about its own axis relative to said other bracket, said tubular member having a straight upper portion and a curved lower portion; a tray supported at the lower end of said tubular supporting member; means associated with said linkage for releasably engaging with at least one of said parallel links to prevent movement of said linkage with respect to said tubular supporting member; and means for operating said engaging means.

5. A dental tray supporting mechanism of claim 4, wherein one of said parallel links has a plurality of teeth formed thereon and said means associated with said linkage comprises an axially movable operating rod enclosed in the straight upper portion of said tray supporting tubular member and a lever mounted on said other bracket and operable by said operating rod, said lever having a pawl so adapted as to releasably and selectively engage with any one of said plurality of teeth formed on one of said parallel links to lock movement of said first-named linkage, whereby the tray is held stable in the desired position; and said last-named operating means comprises a second lever having one arm operatively supporting said operating rod and the other arm formed into a push-button, said second lever being so arranged that when operated, it moves said axially movable operating rod to turn said first-named lever so that its pawl disengages from one of said teeth on one of said parallel links, whereby said first-named linkage is released.

References Cited by the Examiner

UNITED STATES PATENTS

| | | | |
|---|---|---|---|
| 699,732 | 5/1902 | Williams | 74—106 |
| 790,207 | 5/1905 | Holtz | 248—281 |
| 1,050,672 | 1/1913 | MacIntosh | 248—281 |
| 1,139,581 | 5/1915 | Riley | 248—281 |
| 1,272,845 | 7/1918 | Peck et al. | 248—280 |
| 1,522,128 | 1/1925 | Johnson | 248—281 |
| 1,557,580 | 10/1925 | Gover | 74—102 |
| 2,036,097 | 3/1936 | Pieper | 248—281 |

CLAUDE A. LE ROY, *Primary Examiner.*

J. H. LACHEEN, R. P. SEITTER, *Assistant Examiners.*